United States Patent
Rodrigues De Paula et al.

(10) Patent No.: US 11,585,417 B2
(45) Date of Patent: Feb. 21, 2023

(54) BALL SCREW NUT WITH END STOP FOR RESET SPRING

(71) Applicant: SCHAEFFLER TECHNOLOGIES AG & CO. KG, Herzogenaurach (DE)

(72) Inventors: Renato Rodrigues De Paula, Sterling Heights, MI (US); Michael Zinnecker, Berkley, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 129 days.

(21) Appl. No.: 16/677,974

(22) Filed: Nov. 8, 2019

(65) Prior Publication Data

US 2021/0140520 A1 May 13, 2021

(51) Int. Cl.
*F16H 25/24* (2006.01)
*F16H 25/22* (2006.01)

(52) U.S. Cl.
CPC ......... *F16H 25/2204* (2013.01); *F16H 25/24* (2013.01)

(58) Field of Classification Search
CPC .. F16H 25/22; F16H 25/2204; F16D 2125/40; Y10T 74/18576; Y10T 74/1527; Y10T 74/19744; Y10T 74/19781
See application file for complete search history.

(56) References Cited

U.S. PATENT DOCUMENTS

| | | | |
|---|---|---|---|
| 8,616,348 B2 | 12/2013 | Winkler et al. | |
| 8,684,147 B2 * | 4/2014 | Winkler | F16H 25/2238 188/72.6 |
| 8,875,851 B2 | 11/2014 | Winkler | |
| 10,352,418 B2 * | 7/2019 | Aramoto | F16D 65/18 |
| 2015/0330487 A1 * | 11/2015 | Wilhelm | F16H 25/2233 188/72.8 |
| 2020/0141475 A1 * | 5/2020 | Aramoto | F16H 25/2238 |
| 2021/0062899 A1 * | 3/2021 | Brubaker | F16H 25/2204 |

FOREIGN PATENT DOCUMENTS

| | | |
|---|---|---|
| DE | 7640810 U1 | 7/1977 |
| GB | 1302836 A | 1/1973 |

* cited by examiner

*Primary Examiner* — Bobby Rushing, Jr.

(57) ABSTRACT

A ball screw includes a ball screw spindle, and a ball screw nut extending about the ball screw spindle. The ball screw nut has internal threading that corresponds with external threading of the ball screw spindle to define a raceway for rolling elements. The ball screw nut includes one or more bore holes extending from the exterior surface of the ball screw nut, and partially into the ball screw nut. The bore hole defines an end stop. A spring has one end that contacts the end stop, and another end that contacts one of the rolling elements.

16 Claims, 5 Drawing Sheets

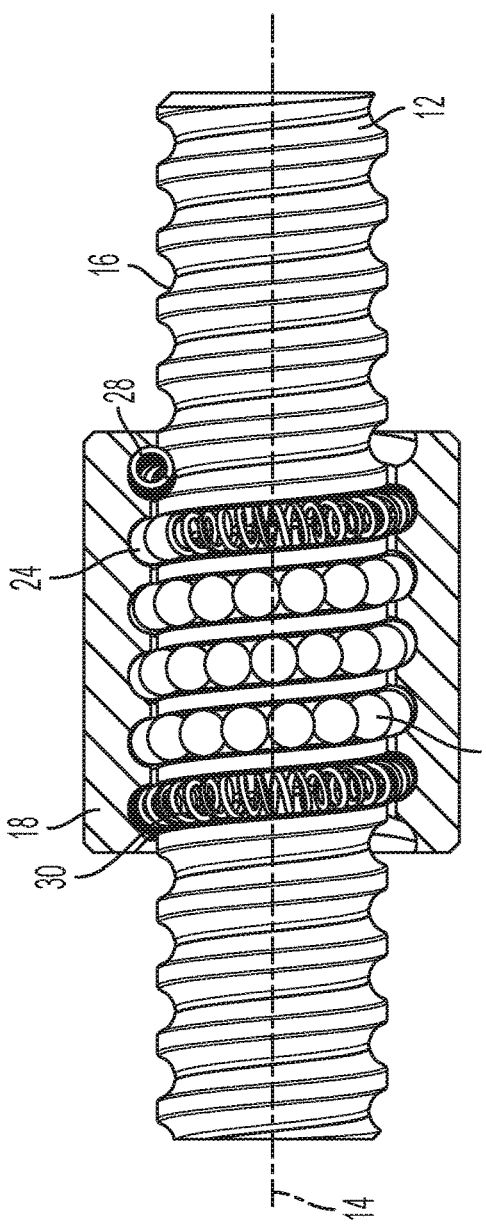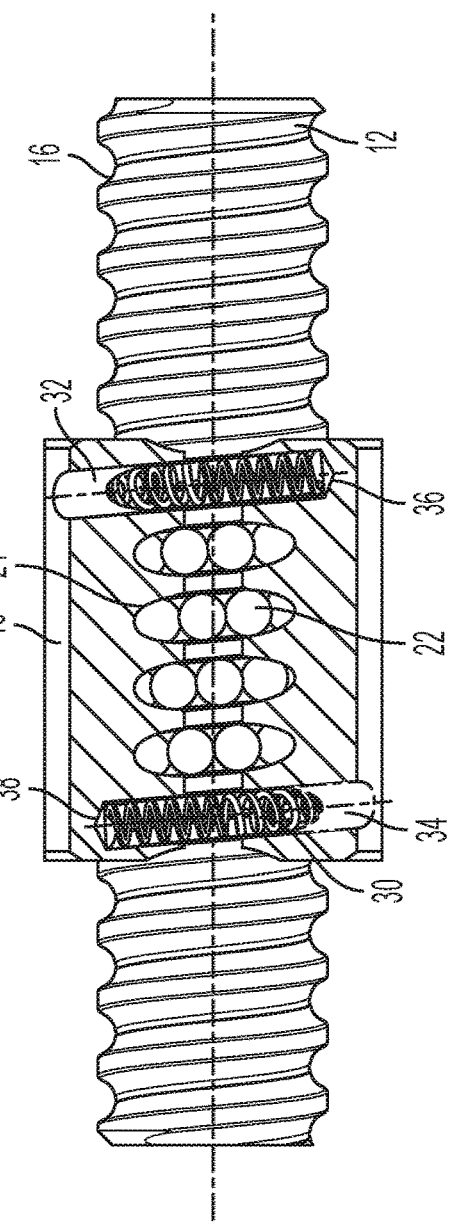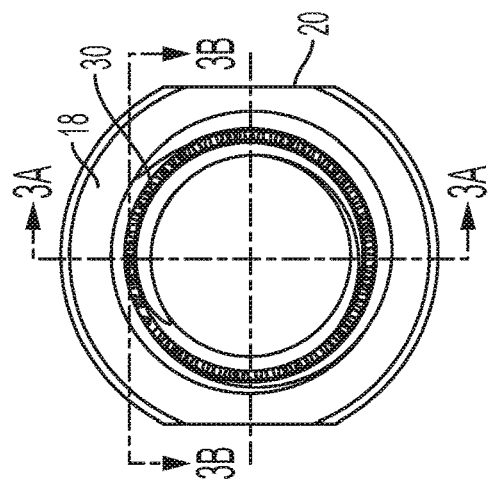

BALL SCREW NUT WITH END STOP FOR RESET SPRING

TECHNICAL FIELD

The present disclosure relates to a ball screw for translating rotational movement into linear movement.

BACKGROUND

A ball screw is one example of a device for translating rotational movement into linear movement. In one example, when a ball screw spindle is rotated, the surrounding ball screw nut may be translated linearly along the axis of the ball screw spindle. This is made possible by rolling elements in contact between outer threading of the ball screw spindle and inner threading of the ball screw nut; the rolling elements travel along the outer threading of the spindle as the spindle rotates, forcing the ball screw nut to travel axially along the spindle.

SUMMARY

In one embodiment, a ball screw includes (i) a ball screw spindle extending along a central axis and having external threading, (ii) a ball screw nut extending about the ball screw spindle and having an internal channel that cooperates with the external threading to define a raceway, (iii) a chain of rolling elements disposed in the raceway, (iv) a first spring disposed in the raceway and providing a biasing force against one end of the chain of rolling elements, and (v) a second spring disposed in the raceway and providing a biasing force against another end of the chain of rolling elements. The ball screw nut defines a first bore hole extending partially into the ball screw nut and terminating at a first end stop, and a second bore hole extending partially into the ball screw nut and terminating at a second end stop, wherein the first spring contacts the first end stop and the second spring contacts the second end stop.

In another embodiment, a ball screw includes a ball screw spindle extending along a central axis and having external threading, and a ball screw nut having an internal channel cooperating with the external threading to define a raceway. The ball screw nut includes a bore hole that (i) is open at an outer surface of the ball screw nut, (ii) meets the internal channel, and (iii) ends at a closed end within an interior of the ball screw nut.

In another embodiment, a ball screw nut is configured to wrap about a ball screw spindle of a ball screw. The ball screw nut includes an interior surface defining a helical internal channel defining a portion of a raceway configured to contain a plurality of rolling elements. The ball screw nut also includes an exterior surface defining a bore hole extending only partially into the ball screw nut, meets the internal channel, and terminating at an end surface within the ball screw nut.

BRIEF DESCRIPTION OF THE DRAWINGS

FIG. 2 illustrates an end view of the ball screw of FIG. 1A, according to one embodiment.

FIG. 3A illustrates a cross-sectional view taken along line 3A-3A of FIG. 2 with the ball screw nut shown in cross-section for view of internal components within the ball screw nut, according to one embodiment.

FIG. 3B illustrates a different cross-sectional of FIG. 2 along line 3B-3B with the ball screw nut shown in cross-section for view of internal components within the ball screw nut, according to one embodiment.

DETAILED DESCRIPTION

Figure 1C:
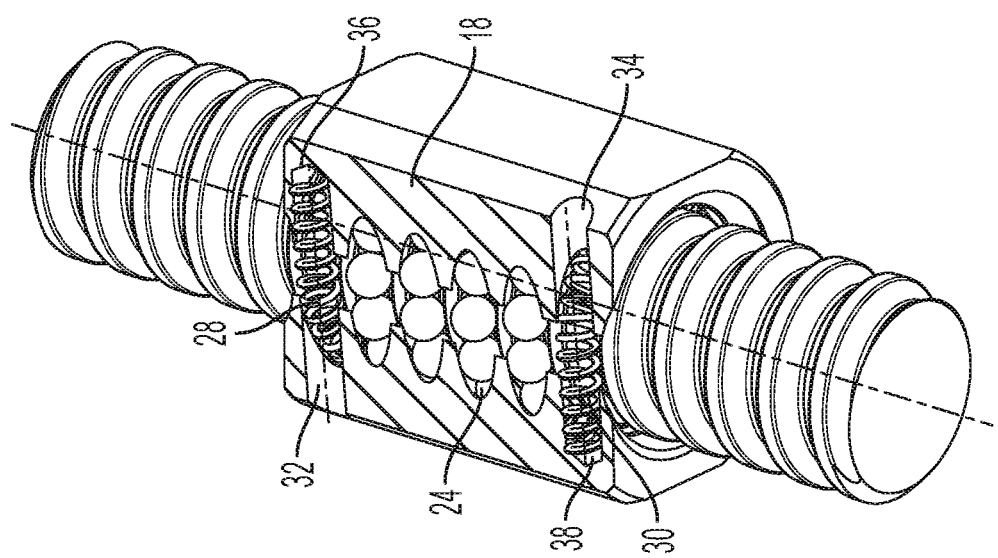
FIG. 1C illustrates a perspective view of the ball screw of FIG. 1A with a cross-sectional "slice" of the ball screw nut removed, according to one embodiment, with the reset spring end stops on the ball nut shown
Figure 1B:
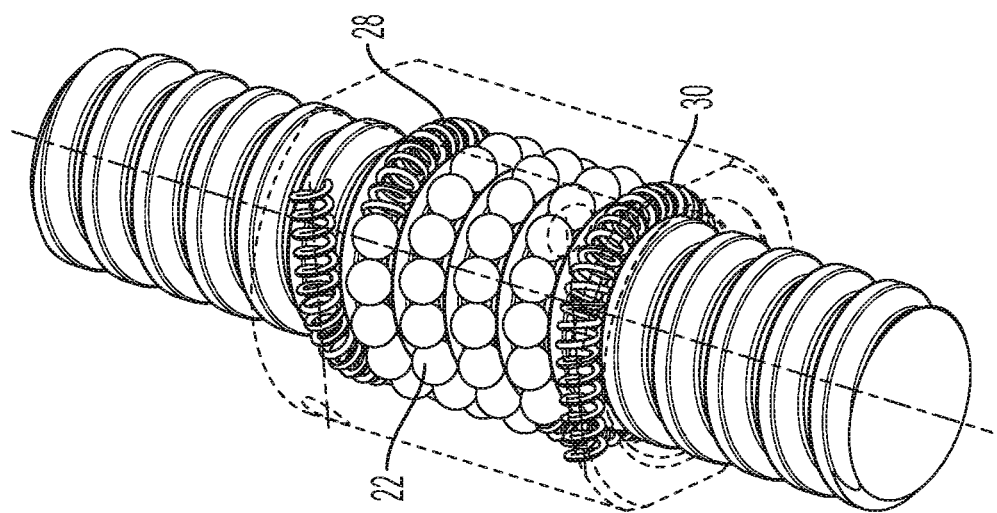
FIG. 1B illustrates a perspective view of the ball screw of FIG. 1A with its ball screw nut removed for viewing of internal components within the ball screw nut, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

Some ball screws have a recirculating path in which the rolling elements transfer from one side of the ball screw nut to the other side as the spindle rotates relative to the ball screw nut. Other types of ball screws do not have a recirculation path for the rolling elements. Instead, a spring may be utilized at the ends of the chain of rolling elements to maintain/reset their position within the ball screw nut during/after actuation while allowing rotation and limited path of travel within the ball screw nut.

According to various embodiments of the present disclosure, a ball screw is provided with a ball screw nut designed with end stops for the springs within the ball screw nut. In certain embodiments, a bore hole is, for example, milled into the ball screw nut, and the surfaces of this bore hole act as a stop for the spring. The bore hole can extend from one lateral side of the ball screw nut, and end within the ball screw nut (e.g., not passing entirely through), wherein the end of the bore hole can act as the stop and contact point for the end of the spring.

Figure 1A:
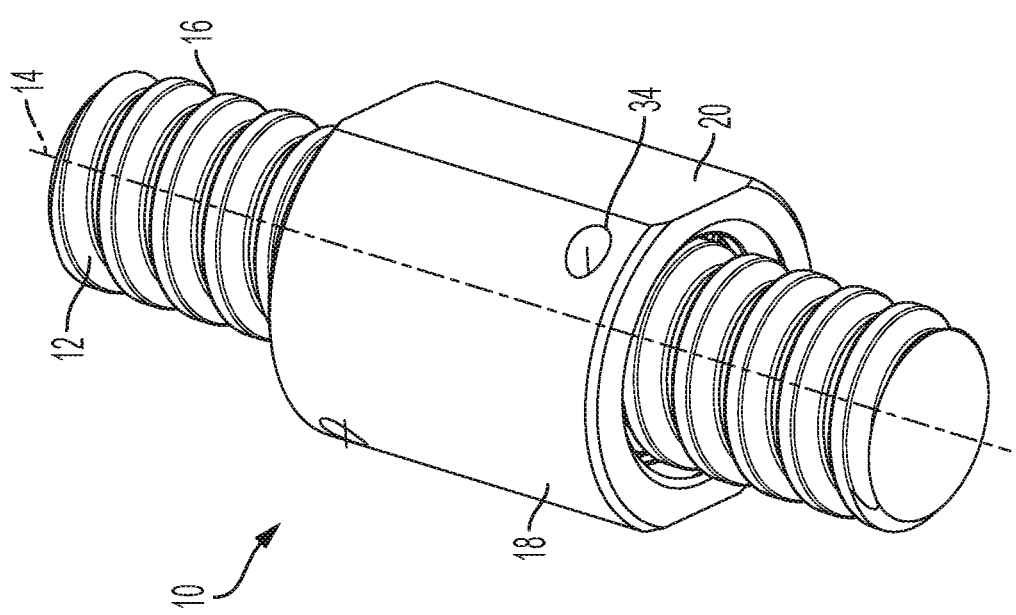
FIG. 1A illustrates a perspective view of a ball screw, according to one embodiment.
Figure 5:
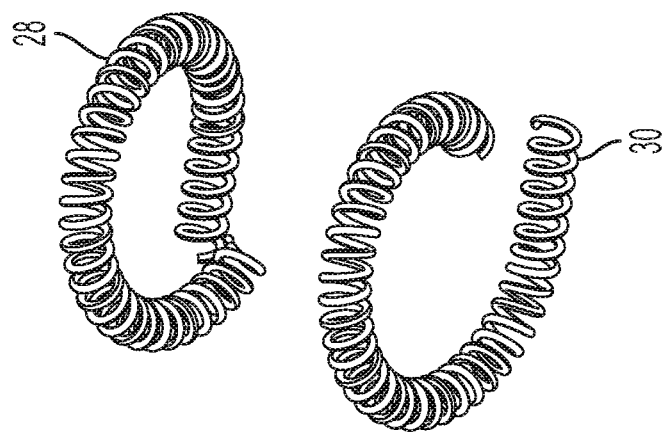
FIG. 5 illustrates a pair of springs that wrap around the spindle of the ball screw and contact the end surfaces of the bore holes of the ball screw nut, according to one embodiment.
Figure 4B:
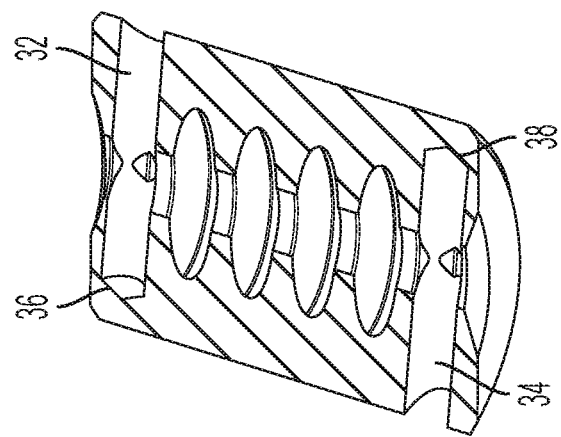
FIG. 4B illustrates a perspective view of the section of the ball screw nut of FIG. 4A, according to one embodiment.
Figure 4A:
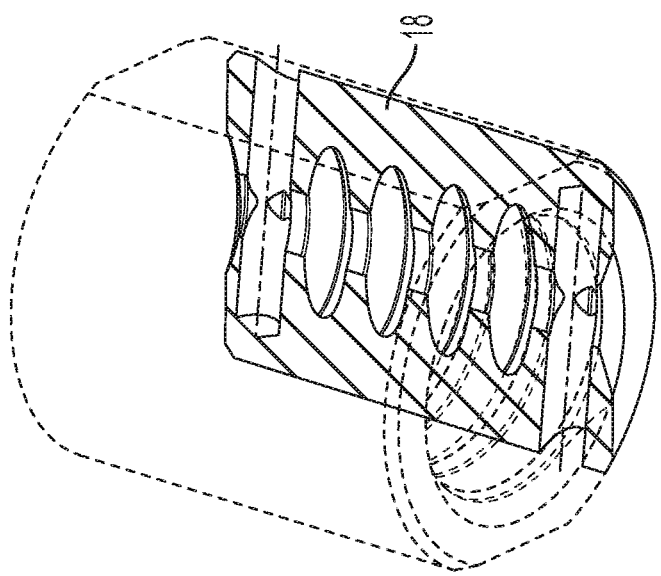
FIG. 4A illustrates a perspective view of the ball screw nut in isolation, with a majority of the ball screw nut hidden to highlight a section of threading of the ball screw nut and bore holes, according to one embodiment.
Figure 6B:
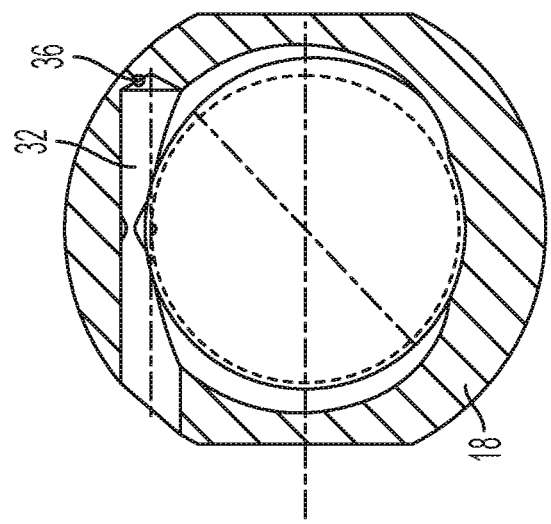
FIG. 6B illustrates a front cross-sectional view of the ball screw nut taken along line 6B-6B of FIG. 6A, according to one embodiment.
Figure 6A:
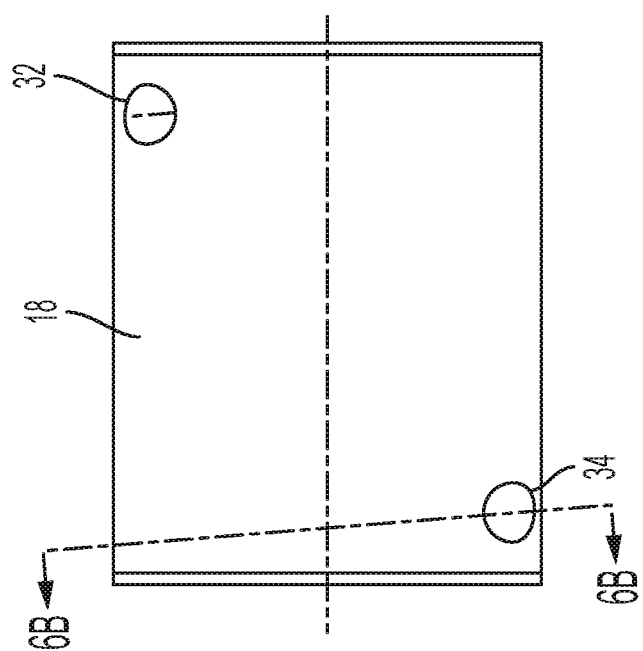
FIG. 6A illustrates a side view of a ball screw nut, according to one embodiment.
Figures 7A, 7B:
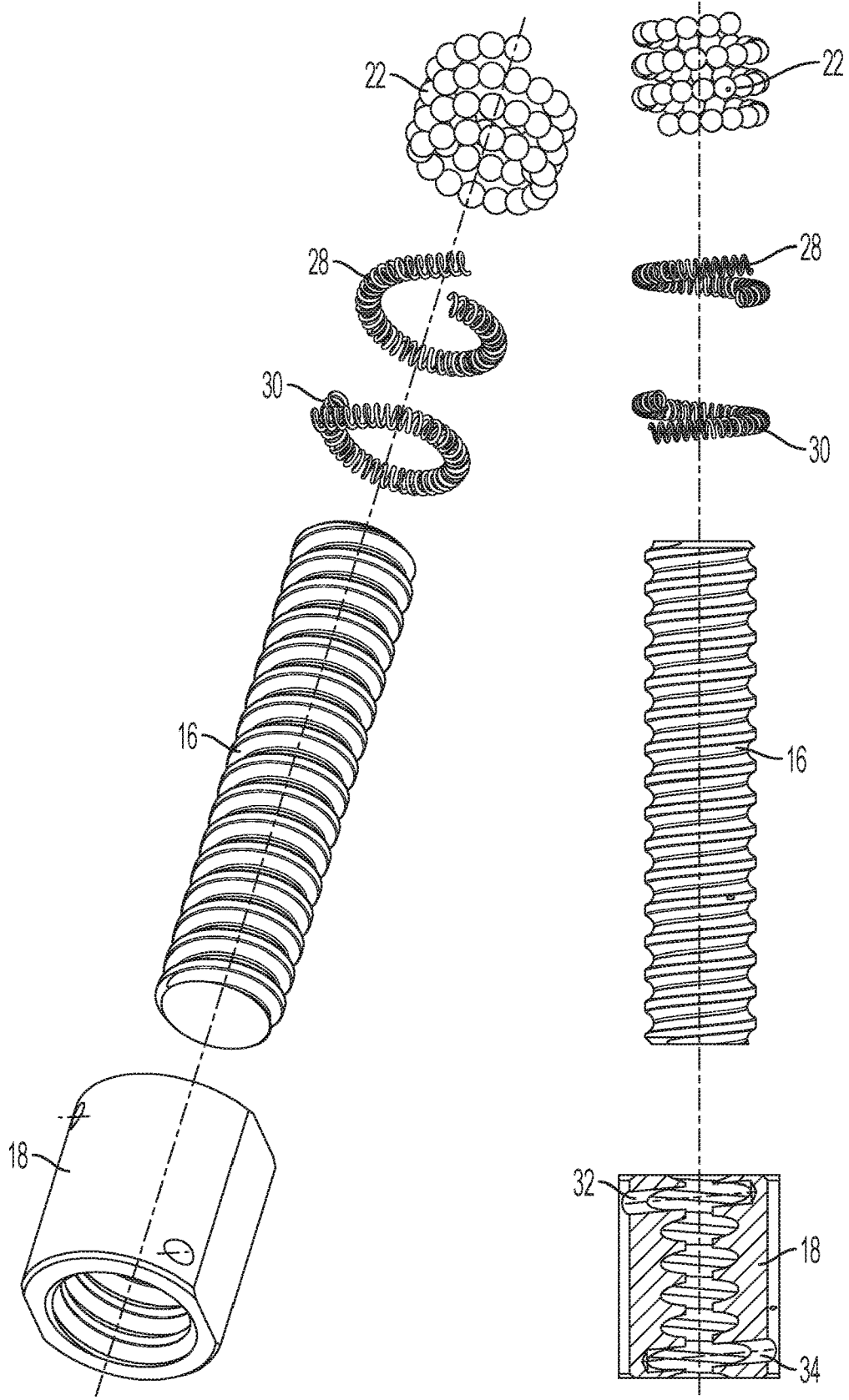
FIG. 7A illustrates an exploded perspective view of the ball screw of FIG. 1A, according to one embodiment.
FIG. 7B illustrates an exploded side view of the ball screw of FIG. 7A with the ball screw nut shown in cross-section, according to one embodiment.

FIGS. 1A-7B are described below, illustrating one embodiment of a ball screw 10. These illustrations are merely exemplary, and several views are shown which can be modified for additional embodiments within the spirit and scope of this disclosure. Referring to FIGS. 1A-1C, the ball screw 10 includes a ball screw spindle 12 extending along a ball screw spindle center axis 14. The ball screw spindle 12 has external threading 16 sized and configured to receive rolling elements described below. The ball screw 10 also includes a ball screw nut 18. The ball screw nut 18 surrounds the ball screw spindle 12. In one embodiment, the ball screw nut 18 has an outer surface that may include one or more planar surfaces 20 that prevents the rotation of the ball screw nut 18, and thus allowing linear translation of the ball screw nut 18 as the ball screw spindle 12 rotates.

To enable the conversion of rotational movement of the ball screw spindle 12 to linear movement of the ball screw nut 18, a plurality of rolling elements 22 are provided, also referred to as a ball chain. The rolling elements 22 may be spherical balls as shown in the FIGS. 1B 1C, 3A 3B, 7A 7B but in other embodiments may be other shapes such as cylindrical, etc. While not shown herein, the rolling elements may be guided by a cage or have spacers between the rolling elements. The rolling elements 22 are received by and travel along the external threading 16 of the ball screw spindle 12. The rolling elements 22 are also received by and travel along an internal channel 24 (also referred to as internal threading or an internal groove) formed within the ball screw nut 18. The internal channel 24 and the external threading 16 cooperate to define a raceway for the rolling elements 22. The internal channel 24 is partially seen in FIG. 1C, and also shown in FIG. 3A for example. The internal channel 24 can be helical in shape traveling along the ball screw spindle center axis 14 and corresponding to the shape of the external threading 16. As the ball screw spindle 12 rotates, the rolling elements 22 can travel along the external threading 16 and the internal channel 24.

A first spring 28 and a second spring 30 may be provided within the ball screw nut 18. The springs 28, 30 may be helical compression springs. While two springs 28, 30 are illustrated, in other embodiments only one spring may be present. The springs 28, 30 (shown in isolation in FIG. 5) are wrapped within the ball screw nut 18 within the internal threading 24, and are also located at least partially about the external threading 16 or external channel of the ball screw spindle 12. The springs 28, 30 provide a biasing force on the rolling elements 22 in opposite directions. For example, as the ball screw spindle 12 is rotated in one direction, the rolling elements may be forced to travel in one circumferential direction about the ball screw spindle center axis 14; and one of the springs presses against the ball chain to prevent movement. The springs 28, 30 also maintain the rolling elements 22 within the ball screw nut 18 and in direct contact with one another in a chain, such that the ball screw 10 is not a recirculating ball screw with rolling elements exiting and entering contact with the external threading 16.

In one embodiment of operation, when there is no load applied on the ball screw nut 18, the springs 28, 30 maintain the rolling elements 22 in position while the ball screw spindle 12 rotates and the planar surfaces 20 holes its axial position. When there is load applied on the ball screw nut 18, the rolling elements 22 compress one of the springs. After the load is released, the springs 28, 30 reset the rolling elements 22 to their initial position.

As shown in several of the Figures, the ball screw nut is provided with bore holes (e.g., pockets, holes, channels, etc.) to provide end stops for the springs 28, 30. For example, the ball screw 18 may have a first bore hole 32 and a second bore hole 34. The bore holes may be formed by removing of material from the ball screw nut 18, for example by drilling or milling. The first bore hole 32 may begin from one side (e.g., the left side in FIG. 1C) and terminate within the ball screw nut 18 to form a first end stop 36. In other words, the first bore hole 32 has an opening on one side of the ball screw nut 18 but only extends partially into the ball screw nut 18. Likewise, the second bore hole 34 may begin from an opposite side (e.g., the right side in FIG. 1C) and terminate within the ball screw nut 18 to form a second end stop 38. In other words, the second bore hole 34 has an opening on one side of the ball screw nut 18 but only extending partially into the ball screw nut 18.

The end stops 36, 38 provide contact points for the first and second springs 28, 30, respectively. For example, the first end stop 36 is the end of the first bore hole 32, and provides a landing spot for the first spring 28 to compress against. During operation, when the springs 28, 30 are compressed, they compress against their corresponding end stop 36, 38.

The bore holes 32, 34 may be formed in a tangential relationship to the internal channel 24. As shown in FIG. 3B for example, the bore holes 32, 34 may extend along respective axes that are generally tangential to the external threading 16 or internal channel 24. A benefit of this is that the ends of the springs 28, 30 that are supported by the end stops 36, 38 are compressed in a linear manner and the center axis of the bore holes 32, 34 is tangential to the pitch angle raceway and spring center axis. The springs 28, 30 can also be fully enclosed within the pocket.

At the end of assembly, the bore holes may be plugged, capped, or otherwise covered to prevent debris and contaminants from entering the pathway between the ball screw spindle 12 and the ball screw nut 18 where the rolling elements 22 travel.

With the embodiments described above, the springs can be secured within the ball screw nut without the need for additional fasteners or pins. Furthermore, installation of the springs within the ball screw nut is made easier, which may allow an assembler to insert the springs into the bore holes, press the springs until they are compressed against the corresponding end stops at the end of the bore holes, and release the spring to allow the spring to take the shape of the raceway formed between the external threading and the internal channel of the ball screw nut.

In one embodiment, the ball screw 10 explained herein can be used for a vehicle brake, in which linear movement of the ball screw nut 18 actuates a piston of the brake. The ball screw 10 can also be used in a fork shift actuator for transmissions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.
10 ball screw
12 ball screw spindle
14 ball screw spindle center axis
16 external threading
18 ball screw nut
20 planar surface of ball screw nut
22 rolling elements
24 internal channel
28 first spring
30 second spring
32 first bore hole
34 second bore hole
36 first end stop
38 second end stop

What is claimed is:

1. A ball screw, comprising:
a ball screw spindle extending along a central axis and having external threading;
a ball screw nut extending about the ball screw spindle and having an internal channel that cooperates with the external threading to define a raceway;
a chain of rolling elements disposed in the raceway;
a first spring disposed in the raceway and providing a biasing force against one end of the chain of rolling elements; and
a second spring disposed in the raceway and providing a biasing force against another end of the chain of rolling elements; and wherein the ball screw nut defines a first bore hole extending from a first side of the ball screw nut and terminating partially through a second side of the ball screw nut so as to form a first end stop, and a second bore hole extending from the second side and terminating partially through the first side so as to form a second end stop, wherein the first spring contacts the first end stop and the second spring contacts the second end stop.

2. The ball screw of claim 1, wherein the first and second bore holes intersect the raceway.

3. The ball screw of claim 1, wherein the first and second bore holes each extend in a direction tangential to the raceway.

4. The ball screw of claim 1, wherein the first bore hole and the second bore hole extend in opposite directions into the ball screw nut.

5. The ball screw of claim 1, wherein the first bore hole is cylindrical and the second bore hole is cylindrical.

6. A ball screw comprising:
a ball screw spindle extending along a central axis and having external threading;
a ball screw nut having an internal channel cooperating with the external threading to define a raceway, wherein the ball screw nut includes a first bore hole that (i) is open at an outer surface of the ball screw nut, defining a first open end of the first bore hole, (ii) extends across the internal channel, defining a medial portion of the first bore hole, and (iii) ends within an interior wall of the ball screw nut, defining a first closed end of the first bore hole;
a plurality of rolling elements disposed along a portion of the raceway; and
a spring having a first end contacting the first closed end of the first bore hole and a second end contacting one of the rolling elements.

7. The ball screw of claim 6, wherein the internal channel is helical in shape and the first bore hole is linear.

8. The ball screw of claim 6, further comprising a second bore hole that (i) is open at the outer surface of the ball screw nut, defining a second open end of the second bore hole, (ii) extends across the internal channel, defining a medial portion of the second bore hole and (iii) ends within the interior wall of the ball screw nut, defining a second closed end of the second bore hole.

9. The ball screw of claim 8, wherein the second bore hole extends in an opposite direction as the first bore hole.

10. The ball screw of claim 8, further comprising a second spring having a first end contacting the second closed end of the second bore hole, and a second end contacting another one of the rolling elements.

11. The ball screw of claim 8, wherein the first bore hole and the second bore hole extend in a direction tangential to the raceway.

12. A ball screw nut configured to be positioned about a ball screw spindle of a ball screw, the ball screw nut comprising:
an interior surface defining a helical internal channel defining a portion of a raceway configured to contain a plurality of rolling elements forming a chain;
a first spring disposed in the raceway and providing a biasing force against one end of the chain; and
a second spring disposed in the raceway and providing a biasing force against another end of the chain;
a first bore hole extending: (i) from a first side of the ball screw nut, and (ii) across the helical internal channel to define a first end stop on an opposite side of the ball screw nut, wherein the first end stop provides a contact point for the first spring; and wherein the first spring and the second spring maintain the chain within the ball screw nut.

13. The ball screw nut of claim 12, wherein the first bore hole extends in a linear direction.

14. The ball screw nut of claim 13, wherein the first bore hole extends tangential to the raceway.

15. The ball screw nut of claim 12, further comprising a second bore hole extending: (i) from the opposite side of the ball screw nut, and (ii) across the internal channel to define a second end stop on the first side of the ball screw nut.

16. The ball screw nut of claim 15, wherein the first bore hole extends in a direction opposite to the second bore hole.

* * * * *